(12) United States Patent
Lynch et al.

(10) Patent No.: US 9,697,555 B2
(45) Date of Patent: Jul. 4, 2017

(54) SYSTEMS AND METHODS FOR CREATING A USER CUSTOMIZED BANK CARD

(75) Inventors: William Lynch, West Chester, PA (US); Brian Christopher Beck, Fort Wayne, IN (US)

(73) Assignee: CPI Card Group—Colorado, Inc., Littleton, CO (US)

( * ) Notice: Subject to any disclaimer, the term of this patent is extended or adjusted under 35 U.S.C. 154(b) by 0 days.

(21) Appl. No.: 13/527,431

(22) Filed: Jun. 19, 2012

(65) Prior Publication Data

US 2013/0132229 A1   May 23, 2013

Related U.S. Application Data

(63) Continuation of application No. 13/173,722, filed on Jun. 30, 2011, now abandoned, which is a continuation of application No. 11/818,098, filed on Jun. 13, 2007, now Pat. No. 7,992,774.

(51) Int. Cl.
| | |
|---|---|
| *G06F 17/00* | (2006.01) |
| *G06Q 30/00* | (2012.01) |
| *G06Q 30/06* | (2012.01) |
| *G06Q 20/10* | (2012.01) |
| *G06Q 20/34* | (2012.01) |
| *G06Q 30/02* | (2012.01) |
| *G06Q 40/00* | (2012.01) |

(52) U.S. Cl.
CPC ......... *G06Q 30/0621* (2013.01); *G06Q 20/10* (2013.01); *G06Q 20/105* (2013.01); *G06Q 20/347* (2013.01); *G06Q 30/02* (2013.01); *G06Q 30/0601* (2013.01); *G06Q 40/00* (2013.01)

(58) Field of Classification Search
CPC .... G06Q 30/0601; G06Q 20/12; G06Q 30/02; G06Q 20/10; G06Q 30/06; G06Q 30/0621; G06Q 40/00; G06Q 10/10; G06Q 20/00; G06Q 30/0641; G06Q 40/12; G06Q 50/01; G06Q 20/40; G06Q 50/24; G06Q 30/00; G06Q 20/20; G06Q 30/0643

USPC ....... 235/380, 492, 486; 705/14.47; 715/751
See application file for complete search history.

(56) References Cited

U.S. PATENT DOCUMENTS

| | | |
|---|---|---|
| 5,410,642 A | 4/1995 | Hakamatsuka et al. |
| 5,886,334 A | 3/1999 | D'Entremont et al. |
| 5,889,941 A | 3/1999 | Tushie et al. |

(Continued)

FOREIGN PATENT DOCUMENTS

| | | |
|---|---|---|
| EP | 0412520 | 2/1991 |
| EP | 0878956 A1 | 11/1998 |

(Continued)

OTHER PUBLICATIONS

"Session (Computer Science)", May 30, 2007, Wikipedia.org.*
Claessens, et al., On the Security of Today's On-line Electronic Banking Systems, Dec. 27, 2001, Computers & Security.

*Primary Examiner* — Thien T Mai
(74) *Attorney, Agent, or Firm* — Marsh Fischmann & Breyfogle LLP

(57) ABSTRACT

One form of the present invention contemplates a unique system for creating a customized bank card by a consumer/user based on instructions from a remote terminal. Other forms of the present invention contemplate unique apparatuses, systems, devices, hardware, software, methods, and combinations of these for creating customized bank cards.

19 Claims, 10 Drawing Sheets

(56) References Cited

U.S. PATENT DOCUMENTS

| | | |
|---|---|---|
| 6,328,209 B1 | 12/2001 | O'Boyle |
| 6,344,853 B1 | 2/2002 | Knight |
| 6,402,028 B1 | 6/2002 | Graham et al. |
| 6,493,677 B1 | 12/2002 | von Rosen et al. |
| 6,575,372 B1 | 6/2003 | Everett et al. |
| 6,968,335 B2 | 11/2005 | Bayliss et al. |
| 7,044,395 B1 | 5/2006 | Davis et al. |
| 7,103,230 B1 | 9/2006 | Jam et al. |
| 7,360,692 B2 | 4/2008 | Zellner et al. |
| 7,576,752 B1 | 8/2009 | Benson et al. |
| 2002/0025085 A1 | 2/2002 | Gustafson et al. |
| 2002/0052806 A1* | 5/2002 | Hodson .................. G06Q 30/06 705/26.8 |
| 2002/0057454 A1 | 5/2002 | Ueda et al. |
| 2002/0078146 A1 | 6/2002 | Rhoads |
| 2004/0099730 A1 | 5/2004 | Tuchier et al. |
| 2004/0099731 A1 | 5/2004 | Olenick et al. |
| 2004/0144472 A1 | 7/2004 | Cowie |
| 2004/0153332 A1 | 8/2004 | Libuit et al. |
| 2004/0160624 A1 | 8/2004 | Elgar et al. |
| 2004/0254833 A1* | 12/2004 | Algiene .......................... 705/14 |
| 2005/0167487 A1 | 8/2005 | Conlon et al. |
| 2007/0063031 A1 | 3/2007 | Silverbrook et al. |
| 2007/0075134 A1 | 4/2007 | Perlow et al. |
| 2007/0102510 A1 | 5/2007 | Beemer et al. |
| 2007/0156837 A1* | 7/2007 | Elgar et al. .................. 709/208 |
| 2007/0185795 A1 | 8/2007 | Petrime et al. |
| 2007/0205290 A1 | 9/2007 | Newbrough et al. |
| 2007/0215699 A1 | 9/2007 | Arego et al. |
| 2007/0246526 A1* | 10/2007 | Elgar et al. .................. 235/380 |
| 2007/0267484 A1 | 11/2007 | Ferrara et al. |
| 2007/0267486 A1 | 11/2007 | Ferrara et al. |
| 2007/0276680 A1 | 11/2007 | Gombert et al. |
| 2008/0000965 A1 | 1/2008 | Zellner et al. |
| 2008/0037900 A1 | 2/2008 | Elgar et al. |
| 2008/0067256 A1 | 3/2008 | Shernaman |
| 2008/0091459 A1 | 4/2008 | Elgar et al. |
| 2008/0219738 A1 | 9/2008 | Zellner et al. |
| 2008/0230616 A1 | 9/2008 | Elgar et al. |
| 2008/0237338 A1 | 10/2008 | Ferrara et al. |
| 2008/0270266 A1 | 10/2008 | Keane |
| 2008/0313205 A1 | 12/2008 | Elgar et al. |
| 2009/0177975 A1* | 7/2009 | Elgar et al. .................. 715/751 |

FOREIGN PATENT DOCUMENTS

| | | |
|---|---|---|
| EP | 0878956 B1 | 11/1998 |
| WO | 0239329 | 5/2002 |
| WO | 03085573 | 10/2003 |
| WO | 2004074961 | 9/2004 |
| WO | 2005081128 | 9/2005 |
| WO | 2006018624 | 2/2006 |
| WO | 2006018636 | 2/2006 |

* cited by examiner

SYSTEMS AND METHODS FOR CREATING A USER CUSTOMIZED BANK CARD

CROSS-REFERENCE TO RELATED APPLICATION

The present application is a continuation of U.S. patent application Ser. No. 13/173,722 filed on Jun. 30, 2011, which is a continuation of U.S. patent application Ser. No. 11/818,098 filed on Jun. 13, 2007, now U.S. Pat. No. 7,992,774, which is hereby incorporated by reference in its entirety.

SUMMARY

One form of the present invention contemplates a unique system for creating a customized bank card by an individual based on instructions from a remote terminal. Other forms of the present invention contemplate unique apparatuses, systems, devices, hardware, software, methods, and combinations of these for creating customized bank cards. Further embodiments, forms, objects, features, benefits, and aspects of the present inventions are disclosed in the following description and drawings.

DESCRIPTION OF THE ILLUSTRATIVE EMBODIMENTS

Figure 1:
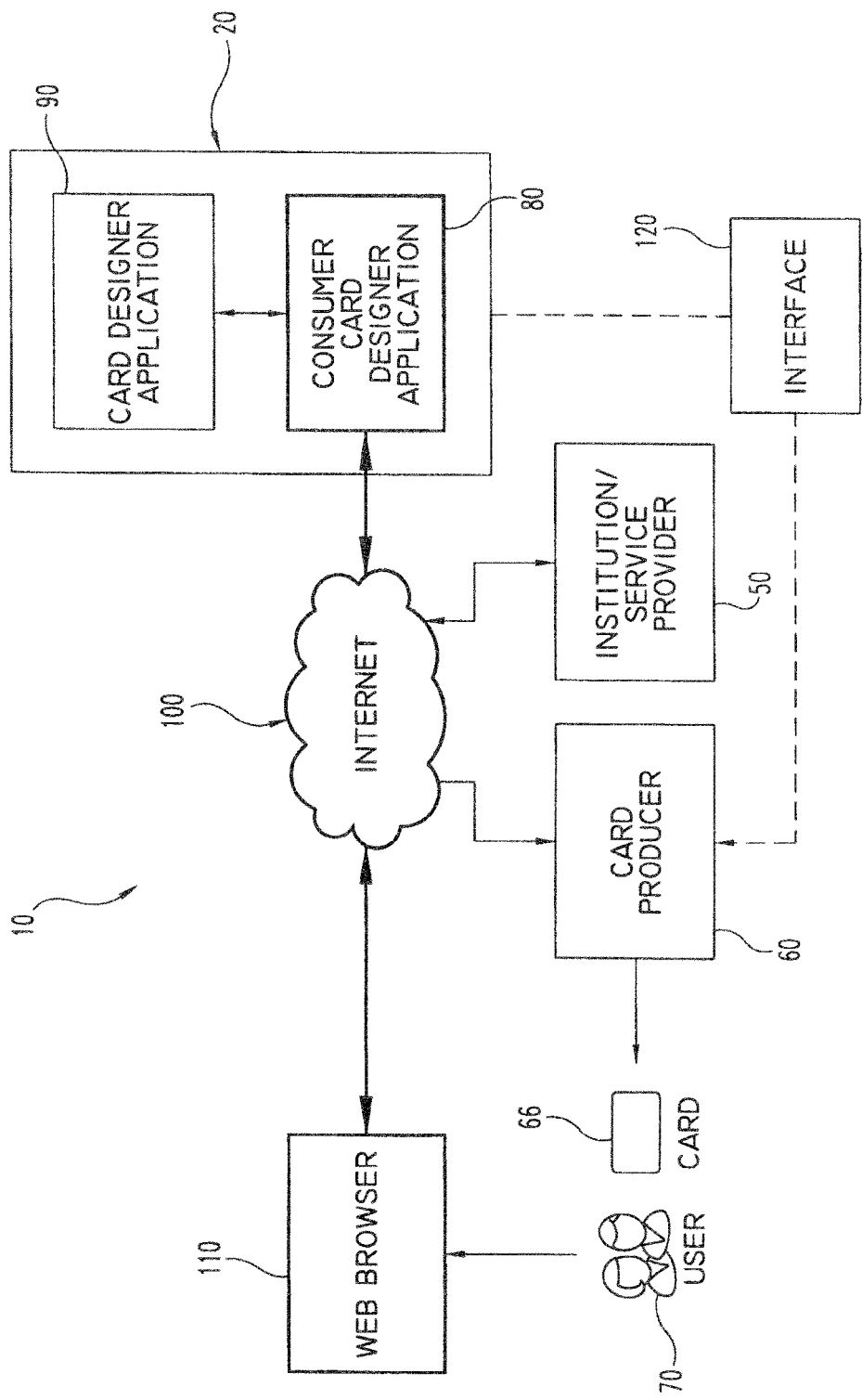
FIG. 1 is an illustrative diagram for creating a customized bank card.

For the purposes of promoting an understanding of the principles of the inventions, reference will now be made to the embodiment illustrated in the drawings and specific language will be used to describe the same. It will nevertheless be understood that no limitation of the scope of the inventions is thereby intended, such alterations and further modifications in the illustrated device, and such further applications of the principles of the invention is illustrated therein being contemplated as would normally occur to one skilled in the art to which the invention relates.

Referring to FIG. 1, there is illustrated a schematic representation of a system 10 for creating a customized bank card. The system 10 includes a consumer card designer 20, a financial institution/service provider 50, a card producer 60, and a consumer/user 70. In one form of the present application, the system 10 is a web-based, consumer-level card design platform which provides financial institutions a convenient, configurable, distinct package for offering self-service bank card personalization to their customers through a home banking solution. A bank card may be a credit card, prepaid card, debit card, gift card, etc.

The consumer card designer 20 is operably coupled via a computer network 100 to each of the institution 50, the card producer 60, and the user 70. The consumer card designer 20 provides a consumer card designer application 80 and a card designer application 90. In one form of the present application, the computer network 100 is an internet connection which the user 70 uses to interface with the consumer card designer 20 through a web browser on a remote terminal 110. In some forms of the present application, the user 70, via an e-mail client application (not shown) may also receive emails to confirm card orders or to be notified of non-acceptable card designs.

The consumer card designer application 80 is provided for allowing the user 70 to design the customized bank card 66 from their own digital image or from a pre-designed artwork/image. The consumer card designer application 80 is a front-end application the user accesses to conduct the card design and ordering process. This application demonstrates a look-and-feel and functions according to configuration information established by the institution 50. As described in further detail below, the consumer card designer application 80 supports many institutions and adjusts the associated look-and-feel and functional behavior depending on the originating institution of the user 70. In one form of the present application, the consumer card designer application 80 is a website. In another form, the consumer card designer application 80 is an object oriented programming language based application (ex. Java®) operable to run on the remote terminal 110. In still another form, the consumer card designer application 80 is a website utilizing an object oriented programming language based application. Further details of the consumer card designer application 80 may be found below.

The card designer application 90 is an application, website, or server operable for institutions (and their service providers) to use to manage the configuration, catalogs, approvals, orders and other information related to operations of the consumer card designer application 80. In one form, the card designer application 90 is a website. The card designer application 90 provides back-end management capability for the consumer card designer application 80. The card designer application 90 authorizes and configures an institution's use of consumer card designer application 80, provides tools for institutions to design card design templates (i.e., basic card designs without a background), offers a tailored pre-designed background catalog, and manages their consumer users and to review orders that have been placed within the consumer card designer application 80. Further details of the card designer application 90 may be found below.

The Institution/Service Provider 50 (typically the provider of a home banking solution, which may be the institution itself or a provider of related services), in addition to managing the consumer card designer application 80 configuration via the card designer application 90, provides several direct interfaces to the consumer card designer application 80. In one form of the present application, the financial institution/service provider 50 provides its customers with a card account-specific link (not shown) to the consumer card designer 20 and the financial institution 50 is able to send/receive messages from the consumer card designer 20 regarding card design orders and approvals. One form contemplates that the card account-specific link is a hyperlink to the consumer card designer application 80. Other forms are contemplated such as the card account-specific link is included in a banner advertisement on a webpage or the card account-specific link is sent via email. The card account-specific link may route the user to a secure login screen requiring the user to login prior to initiating the design session.

In one form of the present application, the card account-specific link contains a session ID or unique user key embedded in the link that identifies at least one of the specific user and/or the financial institution to the consumer card designer application 80. The financial institution, in response to the user selecting the card account-specific link sends a payload to the consumer card designer application 80. Upon receipt of the unique user key, the consumer card designer application 80 associates the unique user key with the corresponding payload. In one form, the payload contains at least one of an initial card specification, a terms & conditions text, and privileges text. One form contemplates the initial card specification containing at least one of a financial institution's card template and a record providing basic information needed to initialize the card layout (such as brand mark, debit mark, $3^{rd}$ and $4^{th}$ embossing lines, etc.). Further details regarding the card account-specific link components and operation may be found below.

In one form of the present application, the institution provides at least one interface which allows for at least some of the following data to be communicated from the consumer card designer application 80 to the user 50:

A message that one or more card designs are ready for review/approval. This message may be implemented via e-mail or another automated interface. The behavior of this message may be configured by the institution to limit frequency or periodicy of transmission.

A message that one or more card designs have been approved for printing. This message may ultimately result in the institution/service provider sending an embossing request to the Card Producer.

An interface which can generate a new payload structure from an old design session ID and institution ID. This interface will be used to allow a user to redesign a new card by selecting a previous card design/order from which to start. This interface may return an invalid response if the account is no longer valid.

The card producer 60 is the final destination for the card design image or output. The institution/service provider 50 is responsible for ensuring an embossing request is properly delivered to the card producer 60. In one form of the present application, at least one interface 120 exists allowing the card producer 60 to pull a card design image from the consumer card designer application 80 based on the session ID. In another form of the present application, the consumer card designer application 80 will push the card design image and session ID to the card producer 60 using an automated interface (not shown). The choice of interface is configurable by the institution/service provider 50. The physical card 66 is the final output that is produced by the card producer 60. Following production, the card producer 60 delivers the card 66 to the user 70 typically via mail or other known delivery methods including but not limited to the delivery services provided by FEDEX®, UPS®, and DHL®. In another form of the present application, the card producer 60 delivers the card 66 to the financial institution 50 who then delivers the card 66 to the user 70.

Figure 2:
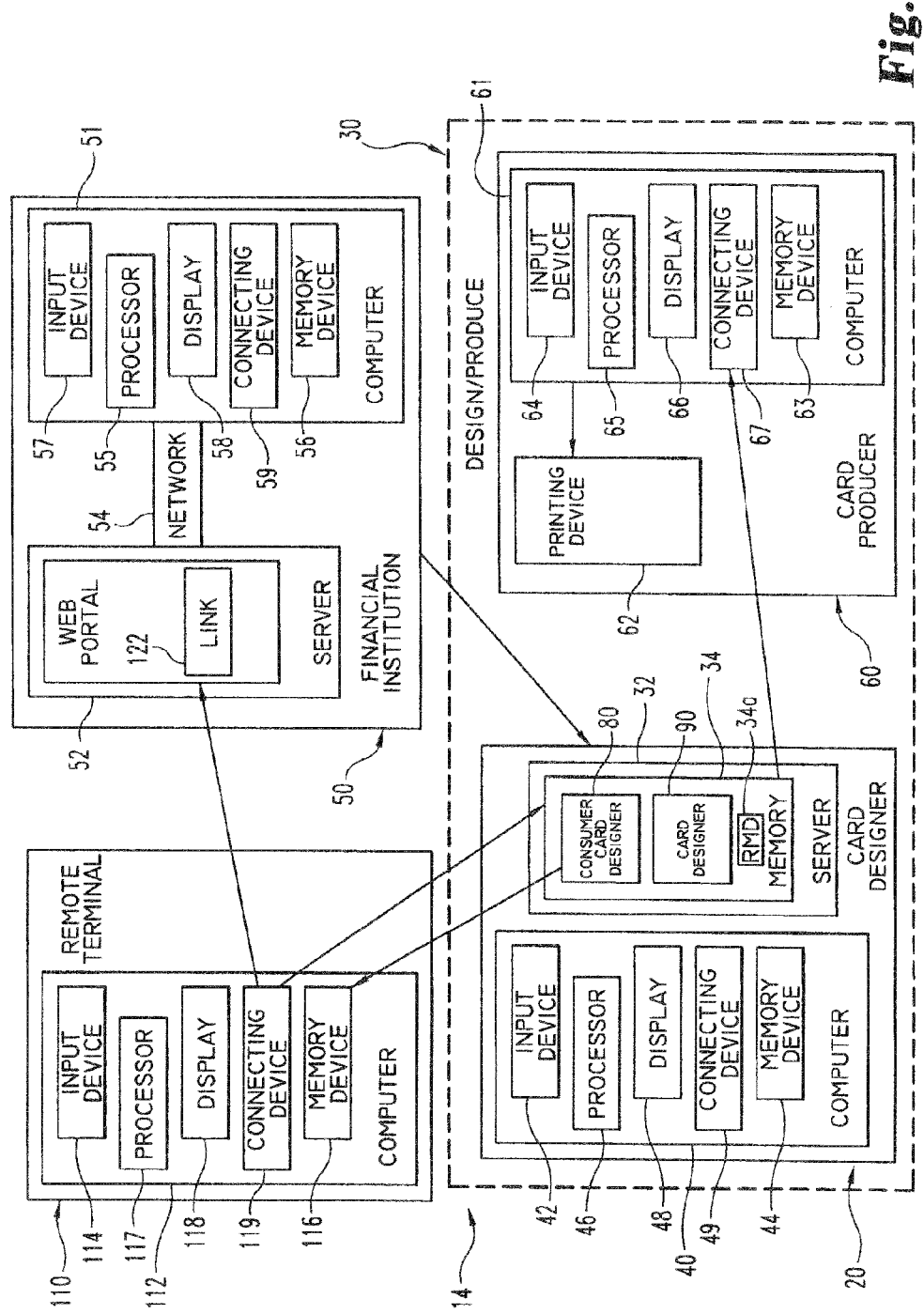
FIG. 2 is an illustrative schematic of computer equipment for creating a customized bank card.

Referring now to FIG. 2, there is shown an illustrative schematic showing various sub-components of computer equipment 14 of the system 10; where like reference numerals refer to like references. The computer system 14 includes the financial institution/provider 50, the card designer 20, the card producer 60, and the remote unit or terminal 110; computer network 100 operatively connects these units together, but is not shown in FIG. 2 to preserve clarity. In one form of the present application, the card designer 20 and the card producer 60 are located at a single design/produce location 30.

The card designer 20 includes a secure computer or server 32 having operating logic and having memory device 34 operable to store the consumer card designer application 80 and the card designer application 90. It is envisioned that memory device 34 is illustrated in association with server 34; however, memory device 34 can be separate from or at least partially included in one or more of digital signal processors (DSP) and/or processors (not shown). Memory device 34 includes at least one Removable Memory Device (RMD) 34a. Memory device 34 can be of a solid-state variety, electromagnetic variety, optical variety, or a combination of these forms. Furthermore, memory device 34 can be volatile, nonvolatile, or a mixture of these types. Memory device 34 can be at least partially integrated with circuitry, DSP, and/or processor (not shown). RMD 34a can be a floppy disc, cartridge, or tape form of removable electromagnetic recording media; an optical disc, such as a CD or DVD type; an electrically reprogrammable solid-state type of nonvolatile memory, and/or such different variety as would occur to those skilled in the art. In still other embodiments, RMD 34a is absent.

In one form of the present application, the card designer 20 further includes an approver computer 40 for approving appropriateness of images utilized in creating the customized bank card. The approver computer includes an input device 42 such as a keyboard or mouse, a memory device 44, a processor 46, a display 48, and a communication interface in the form of a connecting device 49. Memory device 44 is or may be similar to memory device 34 discussed above. The communication interface 49 is operable to connect the approver computer 40 to the network 100. As discussed in further detail below, the server 32 transmits a card design image created by the user 70 from the consumer card designer application to the approver computer 40 for review.

The financial institution/service provider 50 includes a provider computer 51 and a provider server 52 housing an institution web page or portal 53. The provider server 52 is coupled to the provider computer 51 through a network 54. The provider computer 51 includes a processor 55, a memory device 56, an input device 57, a display 58 and a communication interface in the form of a connecting device 59. In one form, memory device 56 is similar to memory device 34 discussed above. The communication interface 59 is operable to connect the financial institution/service provider 50 to the computer network 100.

The card producer 60 includes a card producer computer 61 and a card printing device 62. The card producer computer 61 includes a memory device 63 similar to memory device 34 discussed above, an input device 64, a processor 65, a display 66, and a communication interface in the form of a connecting device 67. The communication interface 67 receives the completed card design from the secure server 32. The card producer computer 61 processes the card design and transmits the card design for printing to the card printing device 62. In one form of the present application, the communication interface 67 is operable to connect the card producer 60 to the computer network 100. In another form of the present application the communication interface 67 is operable to form the interface 120 (FIG. 1) between the card producer 60 and the card designer 20. In one specific implementation, card printing device 62 is a credit card printing machine such as the ARTISTA® card printer available from Datacard Group, 11111 Bren Road West, Minnetonka, Minn. 55343 or the K400 Dual-Sided Thermal Printer available from Cimage, 2500 CityWest Boulevard Suite 300, Houston, Tex. 77042.

The remote terminal 110 includes a user computer 112 having at least one input device 114, a memory device 116, a processor 117, a display 118, and a communication interface in the form of a connecting device 119. It is envisioned that the input device 114 is operable to receive inputs from user 70. The input device 114 may be at least one of a mouse, a keyboard, or a cellular phone transmitting a data image.

In one form of the present application, the user 70 accesses the institution web portal 52 through the communication network 100 and then activates a card account-specific link 122. As discussed in detail below, activation of the card account-specific link 122 connects the financial institution/provider 50 to the card designer 20 which in turn connects the user computer 112 to the secure server 32. The consumer card designer application 80 is transmitted or downloaded to the memory device 116 of the user computer 112. The user 70 then may access the consumer card designer application 80 to create a customized bank card. Once the user 70 designs the customized bank card, the card image is sent through the communication interface 119 to the memory device 34 of the secure server 32. Further details relating to the underlying operation of the consumer card designer application 80 may be found below.

Figure 3:
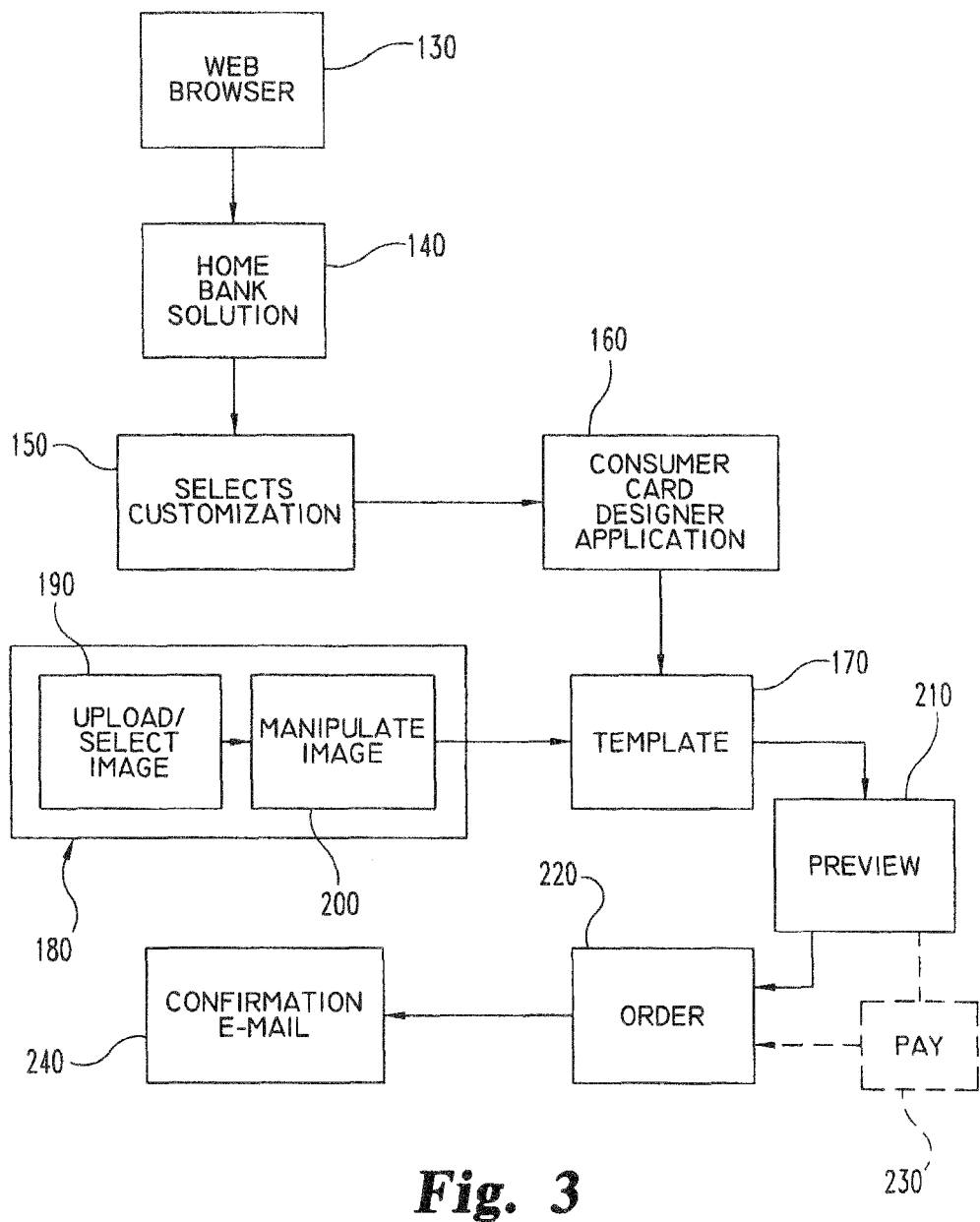
FIG. 3 is an illustrative process flow.

FIG. 3 depicts a process flow diagram showing an overview of operations in typical system use. The user (i.e., a customer of a financial institution) uses a web browser, block 130, to access a home banking solution, block 140, choosing to personalize a debit or credit card associated with an account 150. A URL redirects the user to the consumer card designer application/site, block 160, and presents the user with a pre-established card layout or template, block 170, (e.g., with the VISA brand logo, DEBIT mark, cardholder name, etc.). The template is derived in part from a template built and stored within the card designer, and in part from data contained in the URL which directed the user to the site. An intuitive user interface, block 180, provides the user the ability to upload or select card background art, block 190, and to manipulate its size, orientation and position on the card, block 200. Once complete, the user previews, block 210, and elects to order the new card, block 220, and optionally pays for the card using an online payment system, block 230. When complete, the user receives a confirmation e-mail, block 240, with the details of the order. The card is then printed and delivered to the user. While this scenario illustrates a largely automated, self-service web site, behind the scenes, other activities typically take place.

As discussed in greater detail below, the card design, prior to printing, may be reviewed and approved to ensure the content is appropriate and to identify any potentially problematic printing issues. Once the card has been approved, data interfaces must be invoked both to signal card ordering and to transfer image data to the card producer. In another form of the present application, a user may visit the consumer card designer application/site directly without a link from an existing institution and card account. In still another form of the present application, a user's card may be rejected due to inappropriate content or approved contingent upon user review of comments, such as potential for poor print quality. Examples of inappropriate content include but are not limited to the use of proprietary images, brand images (unless authorized), unauthorized images identified by the financial institution, sexually explicit, and/or offensive language or content. In yet another form of the present application, a user may visit the system, begin a design and save it for further work/review, then revisit the system later to resume and order it. In another form of the present application, the user may visit the system using a link from a prior, completed card order.

FIGS. 4-8 illustrate various flow charts of system operation. Because system 10 exposes a web-based user interface and is client-server in nature, the procedural flows that will be discussed reflect a single user's experience, however, the nature of a web-based application is that many users access the system simultaneously and each is at a different actual point in the same logical process at any given time. This fact requires consideration for both system performance and storage issues as well as any batched or bulk transaction handling (e.g., batch image transfers, frequency of alerts requesting image approvals, etc.). The system process flow begins logically when a visitor arrives at the main consumer card designer application/site and ends, ultimately, when a card is produced as a result of that user's activities. The process could also end when a user aborts the process intentionally or unintentionally such as loss of communication access, at any point.

Figure 4:
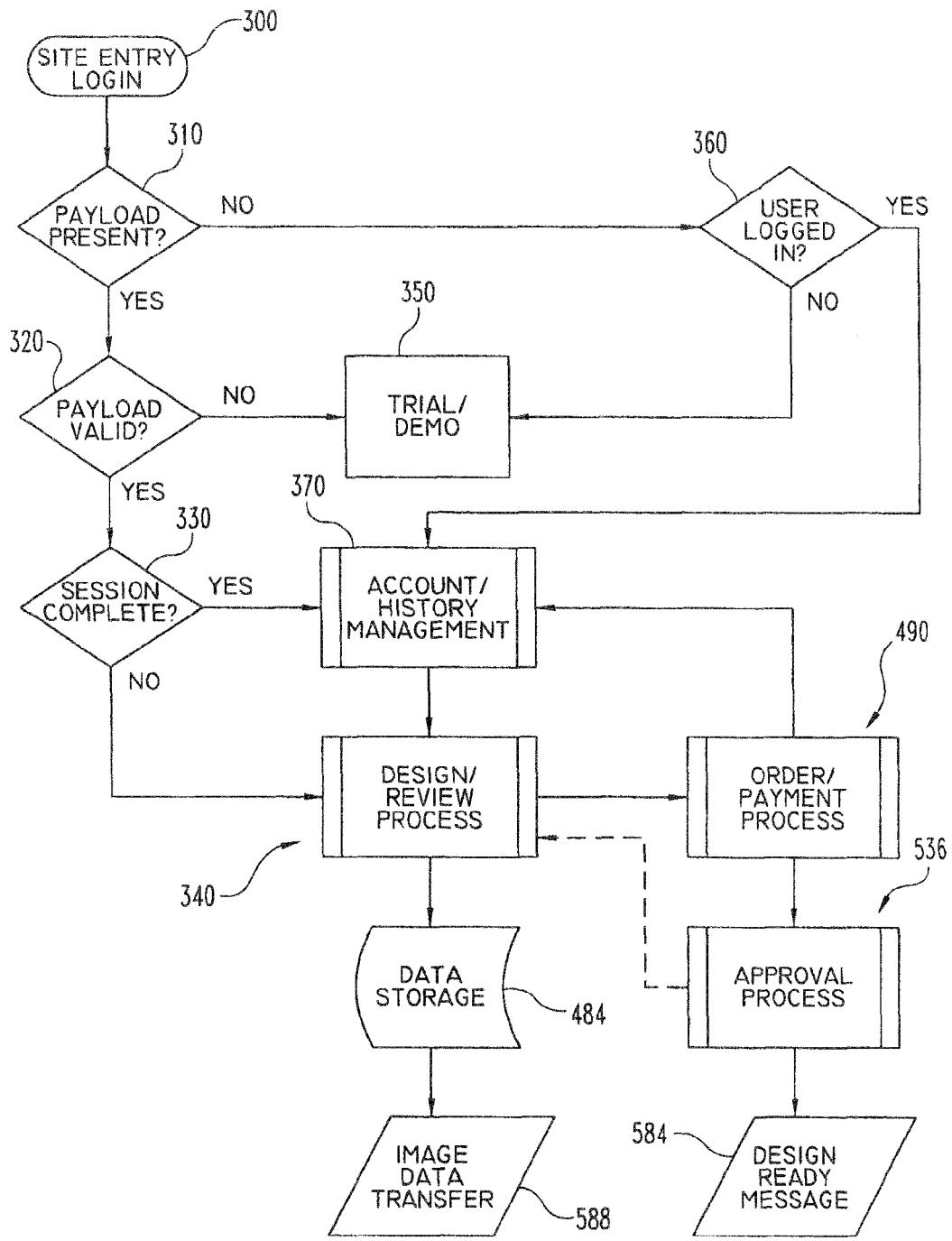
FIG. 4 is a flow chart of a main flow process of the system.

A flow chart of the process is shown in FIG. 4 and provides a view of the system and reflects the card design-order process. While the process is described with various operations, it is within the scope of the present application to have fewer or more processes, then those described below with reference to FIG. 4. Additionally, while the process is described in a specific order, other embodiments may have a different process order.

The process begins with site entry, block 300, which takes place when a user initiates the consumer card designer application/site. Site entry, block 300, may include a user logging into a secured data network/database, further details of login capabilities are discussed below. The system provides an entry page which is accessible via a URL and is configured to accept the "payload." In one form of the present application, in addition to the financial institutions template, the payload includes a record consisting of: embossing lines 3 and 4; brand mark type: VISA®, MASTERCARD®, AMERICAN EXPRESS®, or DISCOVER®; brand mark debit indicator: DEBIT or CREDIT; and a BIN number. The system determines whether the payload is present, block 310. If the payload is present, the system determines whether the payload is valid, block 320. Upon receipt of a valid payload, the system determines whether the design session is complete, block 330. If the design session is not complete (i.e., ordered) the system shall store this payload data, associate it with the user's browser session and redirect the user interface to the Design/Review process, block 340. For users with an invalid payload, the system presents an error message indicating that the information provided was incomplete or invalid and redirect them to the Sessionless Entry process (Trial/Demo), block 350. If the system determines that no payload is present, the system determines whether the user is logged in, block 360. In one form, the user is given the opportunity to login at block 360. If the user is not logged in, the user is directed to the Sessionless Entry, block 350. A successful login of the user where the system determines there is no payload, block 360, redirects the user to the Account/History Management process, block 370. An unsuccessful login attempt shall generate an appropriate error message to the user and shall record the user login attempt in a system log with at least the following: client IP address, username attempted, date and time of attempt.

Referring now to the details of the Sessionless or Trial/Demo process, block 350. The Trial/Demo process provides the user with a mixed graphical and textual introduction to the card design and ordering process. Animated or multimedia presentation formats may be employed to increase user attention and retention and to better illustrate ease of use of the system. In one form of the present application, a demonstration capability in which the user can design a mock card is provided, although the order capability will not be supported.

Referring now to the Account/History Management, block 370, authenticated users have access to an Account/History Management capability. The Account/History Management capability includes a mechanism to view and update current account information and view past order history. In one form of the present application, the system allows an authenticated user to create a new design based on a previous order contained in the order history. This capability is an optional feature for customers of an institution which supports an interface allowing the original design session ID to be duplicated to begin a new design session. If supported and requested by the user, the system connects to the institution's interface, retrieves a new design session payload and redirects the user to the Design/Review process, block 340. If the institution does not support the feature the system returns a failure status and the user is alerted and the new design request aborted.

Referring now to the design/review process, block 340, where the system supports the ability for a user to interactively create a card-proportioned design within the framework of a card template overlay. The card template will be a graphical overlay representing a structure that contains at least one of the following elements: a VISA® or MASTERCARD® brand mark; an optional, corresponding VISA® or MASTERCARD® hologram element; an optional DEBIT text element; a sample card number; a sample card good thru date and a "good thru" text element; optionally, a sample card valid since date and a "valid since" text element; embossing lines 3 and 4; and BIN number text element. If the user is in a design session, the card template shall be retrieved from the corresponding institution's configuration information using, at a minimum, the brand mark type. If the institution does not have a card template corresponding to the brand mark type, an error shall be presented to the operator and the system shall generate an entry in a system log with the following information, at a minimum: institution identification, design session identification, brand mark type, date and time of error. If the user is not in a design session (i.e., no valid payload was received), the card template shall be derived from a default, sample design template provided by the system.

Figure 5:
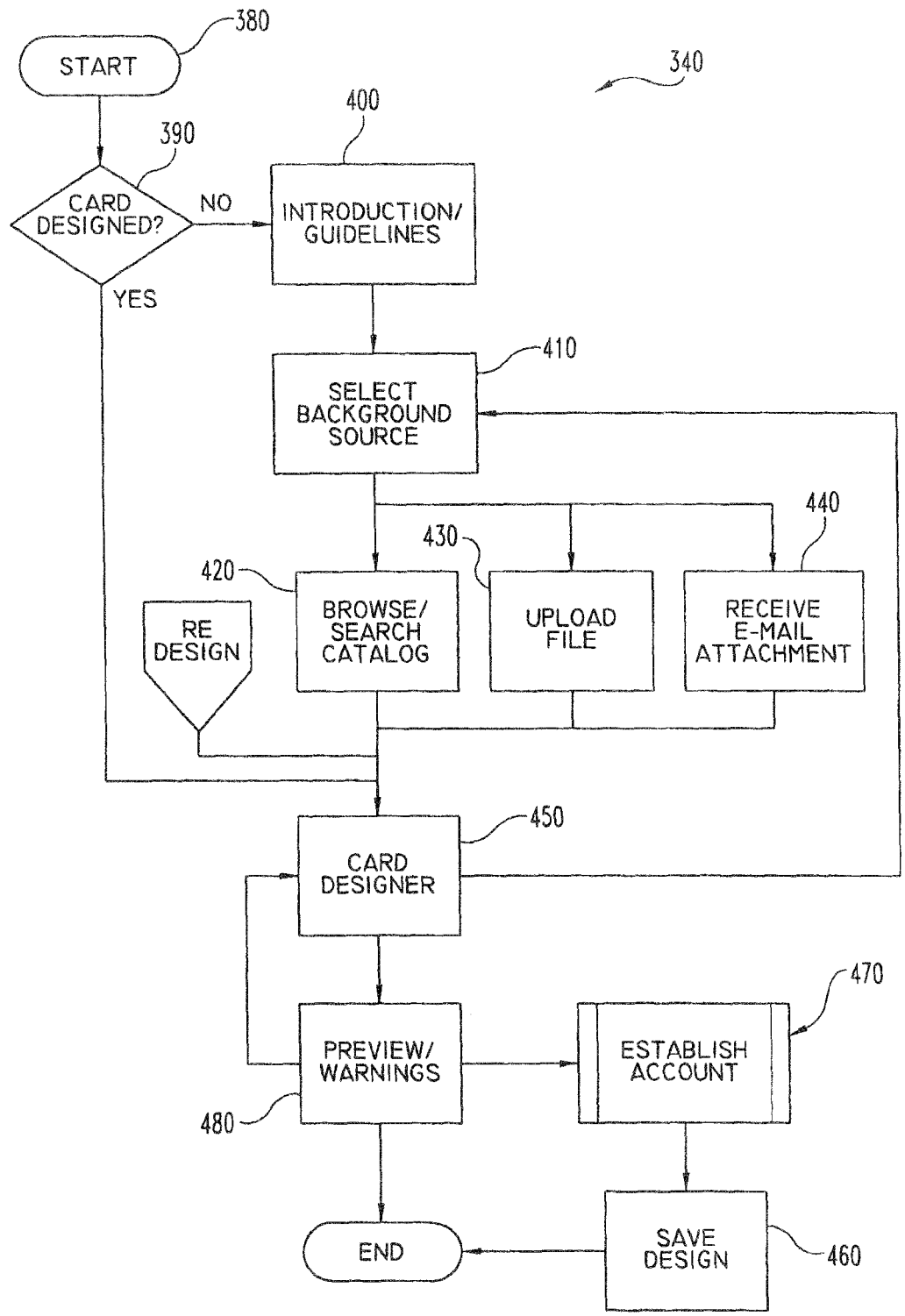
FIG. 5 is a flow chart illustrating the design/review process of FIG. 4.

FIG. 5 illustrates a flow chart of the design/review process 340. The design/review process initiates at block 380 and the system determines whether or not a card has been designed, block 390. If no card has been designed, the system provides an Introduction and/or Guidelines, block 400. The Introduction/Guidelines, block 400, includes a user interface describing the general process of creating a personalized card using the card design tool. This user interface provides sufficient information so that the user may begin the card design process knowing what image source options are available, how to choose the image source desired and how to manipulate the image on the card template. The user interface will also provide sufficient information so that the user will know that the card design must be ordered and paid for before it will be produced. Next, the system requests the user to select background image source, block 410. The Select Background Source, block 410, includes a user interface that allows the user to review and choose between all available background image source options including browse/search catalog of images, block 420; upload a file, block 430; or receive E-mail attachment of an image, block 440.

If the user selects, Upload File, block 430, the system provides a user interface which allows the user to upload an image file from the user's local storage (e.g., hard drive, camera, removable media, cell-phone etc.). The user interface provides information on the optimal file format, dimensions and resolution: uncompressed image at 300 dpi with a size of 1050 by 672 pixels. In one form of the present application, the user interface provides information on the minimum and maximum allowable file sizes and allowed file types. The upload user interface provides a progress indicator which displays to the user the relative (e.g., 50%) and actual (e.g., 600 KB of 1.2 MB) amount of the file uploaded. This indicator shall be updated frequently to adequately communicate file upload status. The system limits the type and size of files uploaded. In one form of the present application, the system supports JPEG, GIF and PNG file formats and requires the image have a minimum dimension/resolution of 640×480 and 72 dpi. In another form of the present application, the system limits the file size to a maximum, not to exceed, 4 MB. After the file upload is complete, if the image fails to meet system requirements, the user is notified and given the capability to retry the operation. If the image meets the system requirements, the image is stored and the user redirected to the Card Designer, block 450.

If the user selects Browse/Search Catalog, block 420, the system provides a capability for the user to browse and search for images within a pre-established artwork catalog/database. The catalog/database represents images that the institution, the institution's reseller and/or the system administrators have made available for the consumer card designer application/website. In one form of the present application, the images are presented to the user in the following order: first, those offered by the institution, then, those offered by the institution's reseller and, finally, those generally offered by the system. In one form of the present application, the catalog/database is presented in a categorical-arranged thumbnail display. The user has the ability to select a thumbnail and view its corresponding larger preview image. In one form of the present application, the system provides a search capability where the user may search by keyword within the image's name or description. Search results are returned to the user using a graphical thumbnail display using the same ordering logic as the catalog (institution-specific images first, then reseller, then general site images). In some forms of the present invention, the catalog/database may include images for purchase including special images such as sporting teams, copyrighted artwork, colleges, and other images that may require a license agreement. For each image, if an additional cost for the image will be charged, that cost shall be sufficiently visible to the user. After selecting an image from the catalog/database, the user is redirected to the Card Designer, block 450.

The user has the option of selecting receive e-mail attachment, block 440, for the source of the background image. Additionally, the system may provide the capability allowing the user to e-mail an image to a system-generated e-mail address. This capability allows the user to retrieve images from non-local image sources, such as cellular phones and other people's computers. In one implementation of the user electing to use this capability, the system generates a user specific e-mail address which corresponds to an e-mail monitoring capability pre-established by the system. This e-mail address is presented to the user with instructions on sending the image. Image limitations and recommendations, as discussed above in reference to Upload File, block 430, will also be provided. The system monitors incoming e-mail messages and simultaneously provides an indicator to the user showing e-mail receipt status. This indicator updates frequently to adequately communicate e-mail retrieval status. When the e-mail attachment retrieval is complete and if the image fails to meet system requirements, the user is notified and given the capability to retry the operation, otherwise, the image is stored and the user redirected to the Card Designer, block 450. In another implementation, the system emails the user electing this capability, a reply including specific code corresponding to the received image file sent to the user. By entering this code, the user is directed to a design session utilizing his or her emailed image.

Figure 8:
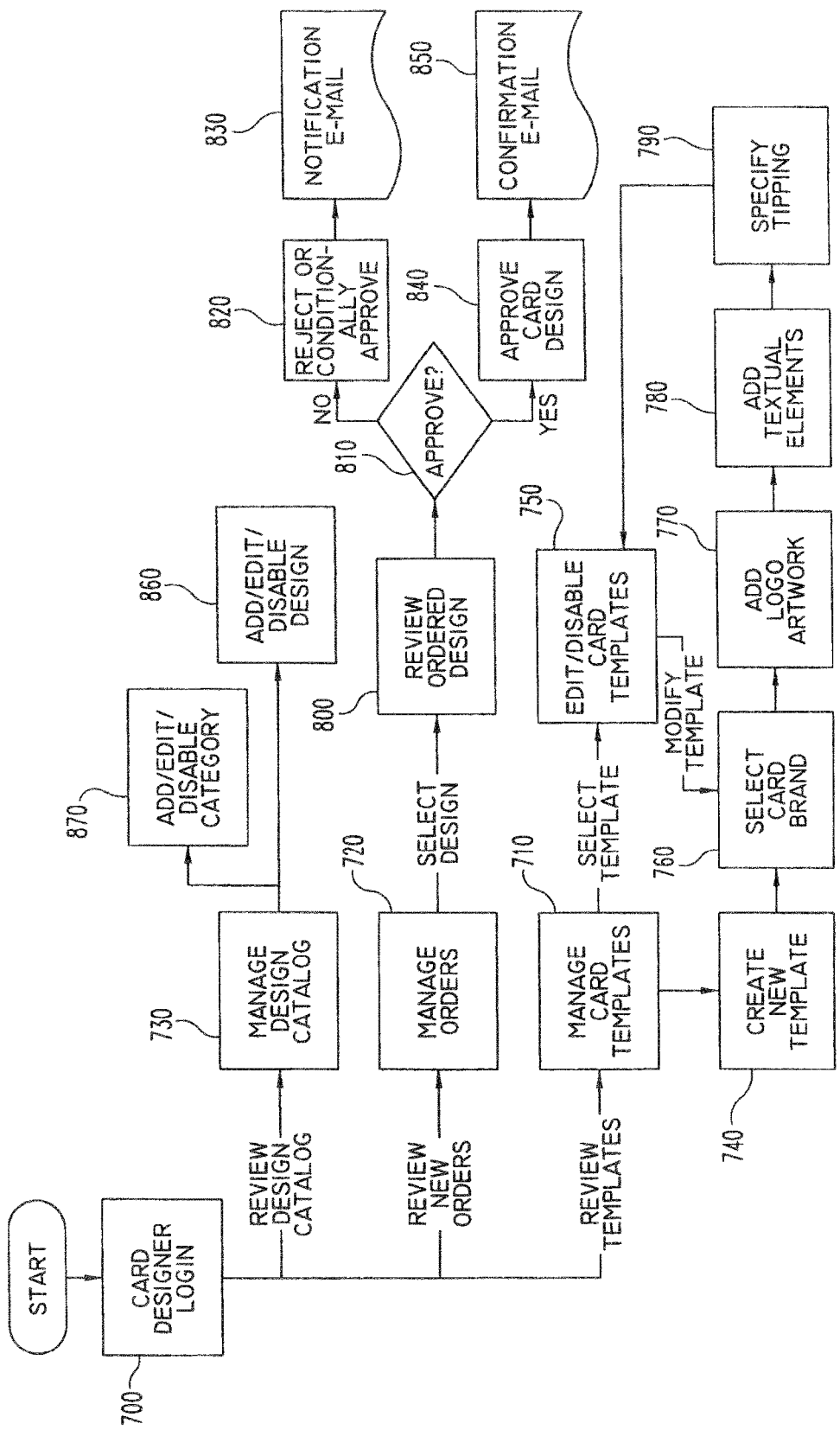
FIG. 8 is a flow chart illustrating consumer card designer administration.

Referring now to the Card Designer, block 450, the system offers a card designer tool which allows the user to manipulate selected aspects of a card design within the constraints of the card template layout. A sample card layout is illustrated in FIG. 8. This layout reflects a complete card design having a user-specified background image 610 (sized proportional to 1050 by 672) overlaid with the card design template (a VISA® brand logo 620 with a hologram 630, positioned logo artwork 640, Good Thru Date indicator 650), system-generated fictitious data (card number and Good Thru date) and payload data specific to this account (BIN number 670, embossing lines three and four 680, DEBIT identifier 690). This example also shows a custom user text element, "My Name" 700.

Referring now to FIG. 5, prior to entry to the card designer, block 450, at least one of the following required data elements must exist: card design template, driven by card brand passed via the payload, or system-generated default for demonstration only; card background image, selected or provided by the user, or system-generated for demonstration only; card account data, to include embossing lines 3 and 4, BIN number, DEBIT indicator, provided via payload, or system-generated for demonstration only. If the user is within a demonstration mode, the card design template and card account data is system-generated. The system generates and displays a card number, good thru date and valid from date (as needed) using fictitious data. The card designer is presented such that the graphical card template layout and auto-generated textual elements appear as an overlay on top of the card background image. In one form of the present application, the consumer card designer application includes display logic which evaluates the color levels of the background image directly under the following text elements and colors the textual element accordingly to provide sufficient contrast: DEBIT indicator, Good Thru text, Valid Since text, BIN Number, Tipping. The system allows for the background image to be manipulated. In some forms of the present application for user-supplied or irregularly-proportioned artwork, the system allows the card background image to be manipulated. In one form of the present application, for pre-designed background artwork, the system prevents the background image from being manipulated.

The system supports at least one of the following background image manipulations:

Rotate 90 degrees clockwise or counter-clockwise
    Flip horizontal
    Flip vertical
    Select sub-image region to crop image proportional to background dimensions.
    This may be done by allowing the size of the image to be adjusted and also allowing the sub image to be moved up, down, left or right within the frame. This may alternatively be done by providing a crop selection tool by which the user can select a card-proportioned section of the image for use as the background.
    Apply recolor colorization effect, from selected tone hues In one form of the present application, the system supports the overlay of a single textual element onto the card background. Other forms contemplate overlaying multiple textual elements. The system supports at least one of the following text characteristics:

Text content
    Text font, from selected font families
    Text font size
    Text font style: normal, bold, italic While in the Card Designer tool, block 450, the user may choose to manipulate the background image and add textual elements and may elect to re-specify a background image by re-visiting the Select Background Source process, block 410. This user manipulation sequence may happen indefinitely until the user chooses to save the design or order the design. Other forms of the present application contemplate, the user being able to overlay a second image over the background such as a face image, enlarge a portion of the background image, add a second image side-by-side to the background image, embedding an image in the background image, etc.

The system provides a capability for the user to save a design in progress, block 460. The system ensures that the user has an existing user account to which to save the design. If the user is not logged in, the user shall be required to login or establish an account. The Establish User Account process, block 470, shall be invoked if the user elects to establish an account, further details of the establish user account process, block 470, may be found below. Once the user account identity has been established, the system saves the design, block 460, and all associated artwork products such that the design can later be accessed by that account. If the user chooses to order the customized bank card, the system directs the user to the Preview/Warnings dialog, block 480. The Preview/Warnings process, block 480, provides a user interface that displays a preview image of the completed card design. This interface provides at least one of the following: institution name, embossing lines 3 and 4, order price and warnings relating to the output of the design. In one form of the present application, the warnings include at least one of the following:

If the card background is not system supplied, if the resolution and dimensions of the cropped card background art is less than 300 dpi at 1050 by 672, the system shall provide a warning that the card's resolution is less than recommended and print degradation may result. A status indicator referring to image resolution level shall be provided.
    The system will calculate approximate contrast under the following regions and alert the user if poor or inadequate contrast may result: DEBIT indicator, Good Thru text, Valid Since text, BIN Number, Tipping.
    If any user-generated textual element exists and has been positioned to intersect with any institution-generated logo or with the VISA®/MASTERCARD® brand logo mark, a warning shall be presented.

If the system displays a warning, the interface requires the user to acknowledge a statement that the warnings have been reviewed and accepted before proceeding. The acknowledgement of these warnings is recorded with the order record. The user is provided a mechanism to return to the Card Designer capability to make adjustments to the card design. The user is also presented with an agreement which states that the card background image and textual elements meet appropriateness guidelines and that the background artwork does not violate usage rights. The interface may require that this agreement be accepted before proceeding. The acceptance of this agreement may be recorded with the order record. Once all the agreements have been accepted and the user elects to proceed, the design is directed to data storage, block 484 and the user is redirected to the Order/Payment process flow 490, as shown in FIG. 4. In one form of the present application, the completed design image is stored at the consumer card designer application/site. In another form, the completed card design is stored at a remote server location (not shown).

Figure 6:
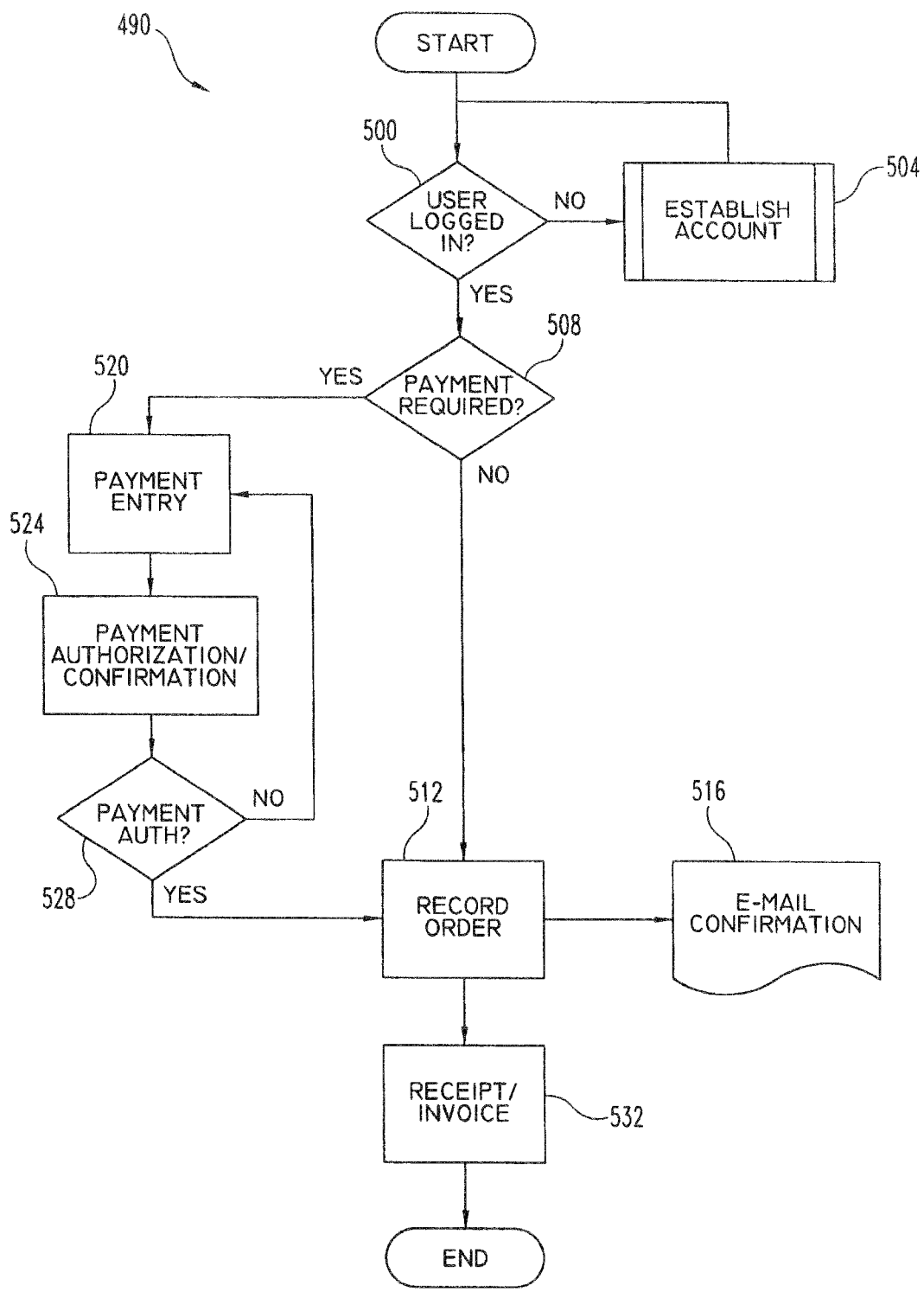
FIG. 6 is a flow chart illustrating the order/payment process of FIG. 4.

Referring now to FIG. 6, there is shown further details of the Order/Payment Process Flow 490. The system first determines whether a user is logged in, block 500. If the user is not logged in or is a new user, the user establishes a new account, block 504 so that order-related e-mail transmissions may be delivered and so that the user may return to the system and view order status. The system next determines whether payment is required, block 508. Payment for the order may be handled by the institution directly. The system supports a mechanism by which the institution can specify self-billing or system payment. If the institution has specified self-billing, the system bypasses all payment related entry and authorization. If the institution has specified system billing, the order requires a successful payment transaction before continuing. After payment, the order is recorded, block 512. Upon completion of the order process, the user shall be sent a confirming e-mail message, block 516, containing, at a least one of the following: the order date and time, the order cost, an order confirmation number, an image of (or a hyperlink to a depiction of) the completed card design, and contact information for gaining additional status for the order.

Referring now to the Establish Account Process, block 504, the system provides a mechanism by which a user may login to the system or else establish a new account within the system. By maintaining an account, a user may leave the system and then return later to resume a card design or may review past orders and order status. The user interface provides a mechanism to allow a user to login to the system using pre-established account information, consisting of, at a minimum, a username and password. The system allows the user to set up a new account by supplying the following items, at a minimum: an e-mail address and a password. Upon request to establish an account, the user is sent a confirmation e-mail. In one form of the present application, the e-mail contains a link or URL which must be visited to confirm the e-mail account as valid. In another form of the present application, the e-mail contains a short alphanumeric code sequence which the user can manually enter to confirm the account.

If the financial institution does not provide for payment, the system provides a secure mechanism by which the user can enter payment means for payment of the order, block 520. The system shall support at least one of the following payment means: a credit card, PayPal, and electronic check/EFT. The user interface validates all required fields to include the validity of the credit card number (e.g., Luhn algorithm) and expiration date before submitting the payment request. After entering the payment, the system provides for Payment Authorization/Confirmation, block 524. The system securely connects to a payment gateway and authorizes the user's payment. Upon successful authorization of the payment, block 528, the system records the payment confirmation details with the order and invokes the Record Order process, block 512. If the connection attempt is unsuccessful, the system redirects the user to the Payment Entry screen, block 520, and displays an appropriate message indicating that the payment was unable to be processed. If the authorization is declined, the system redirects the user to the Payment Entry screen, block 520, and displays the response information from the payment gateway.

Referring now to Record Order, block 512, upon verification of a valid payment source, the system records the order details. The system generates a unique invoice number and assigns this number to the order record. The system presents the user with a printable receipt/invoice, block 532, which serves as the record for the financial transaction. In one form of the present application, the receipt is also made available from within the user's Account/History Management area.

Referring to FIG. 4, in one form of the present application, the system includes an Approval Process 536. In one form of the present application, the approval process is fully automated. In another form of the present application the approval process includes institution designated reviewer(s) and may be manual or partially automated.

Figure 7:
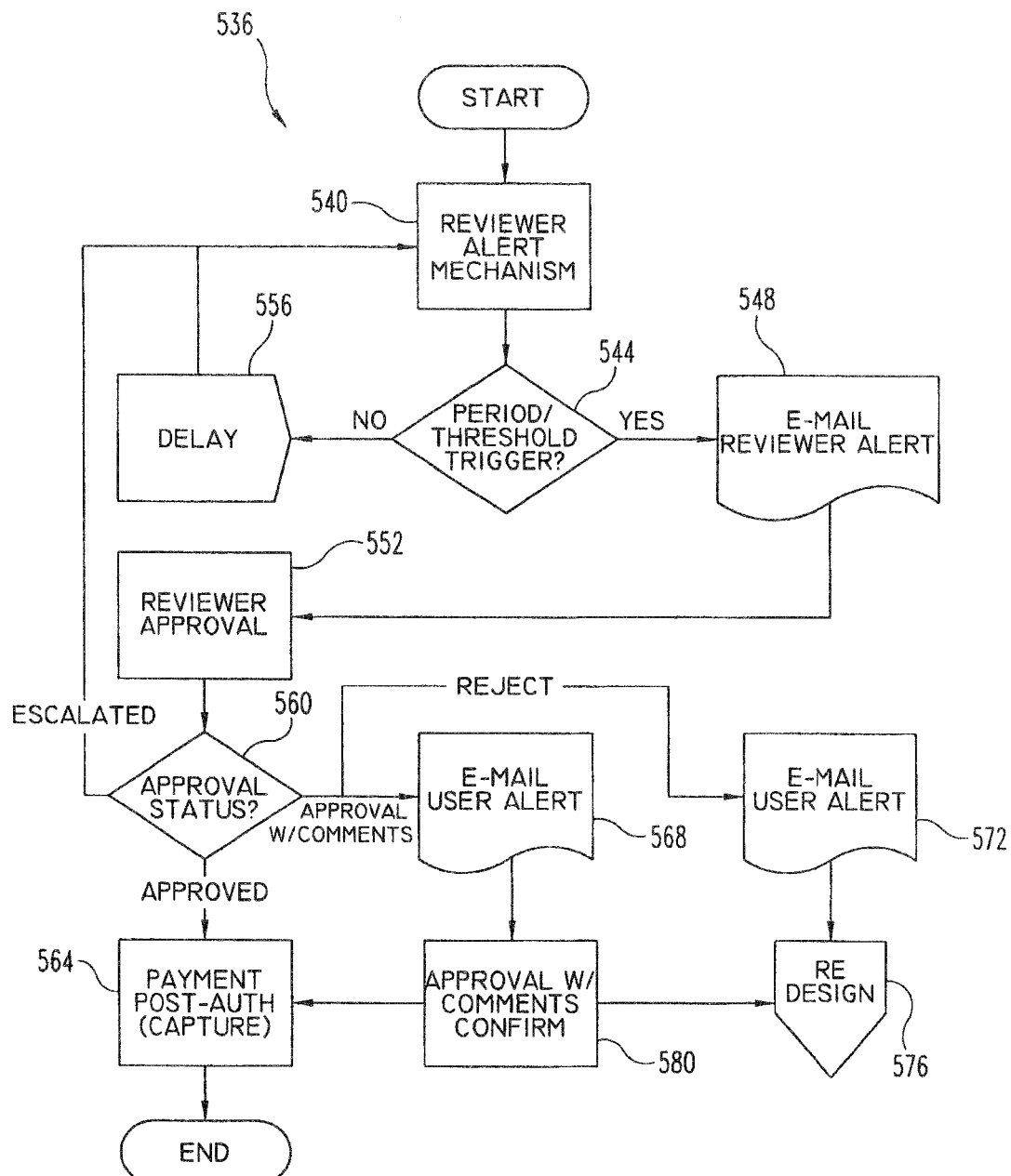
FIG. 7 is a flow chart of the approval process of FIG. 4.

As shown in FIG. 7, the Approval Process Flow 536 includes a Reviewer Alert Mechanism, block 540. Upon receipt of a new order, the system determines whether to send an alert to the institution's designated reviewer(s). This determination is based on the institution's configuration of order review alerts. The institution's configuration includes at least one of the following parameters:

minimum time between consecutive alerts
  minimum number of orders before alerting
  maximum time to wait before sending an alert for a given order
  first level reviewer(s)—to send initial requests for approval
  second level reviewer(s)—to send escalated requests for approval Based on these criteria, if the system determines, block 544, that an alert should be sent, an e-mail is transmitted to the first level reviewer(s), block 548. The e-mail contains a link to the Reviewer Approval interface, block 552. If the system determines, block 544, that an alert is not ready to be sent, the system enters a delay, block 556, based on the configuration parameters. When the delay is complete, the system determines if any alerts are pending to be sent and, if so, shall re-try the above logic.

Referring now to the Reviewer Approval, block 552, one form of the present application contemplates the system supports an interface to allow one or more card designs to be reviewed by a reviewer. In one form of the present application, this interface will be used by the Card Designer application, which will host the order preview and approval capability. In another form of the present application, the interface is supported by the consumer card designer application/site. The reviewer is provided a mechanism to enter comments about the design. This mechanism records the comments along with the reviewer's identity and the date and time of the comments. The system allows an order to be set to at least one of the following states: approved, approved with comments, rejected, and escalated. The system determines whether the order is approved or not, block 560. If an order is "approved" and a payment was authorized during the Order/Payment process, block 490 (FIG. 4), the Payment Post-Authorization process, block 564, shall be invoked. If an order is "approved with comments" or "rejected", an e-mail (block 568 w/comments, block 572 rejected) is generated to the user with at least one of the following: a preview image of the card design, the approval status, the reviewer's comments, and a link to the system which the user can use to regain access. If the design is rejected, the user is given the option to redesign, block 576, the card image. If the design is approved with comments, the user must approve the comments, block 580, prior to proceeding to Payment Post-Authorization, block 564. Additionally, if the approval status is approved with comments, the user interface presents an option in which the user can specify acknowledgement of the comments and order the card "as is". If the user completes this action, the card design order shall be placed in "approved" status and if a payment was authorized during the Order/Payment process 490, the Payment Post-Authorization process 564 shall be invoked.

In one form of the present application, if a user re-accesses the system to update a card design which was approved with comments or rejected (see Reviewer Approval), following login, the user is presented with a user interface which shows the card design image and which provides the status of the approval as well as any comments provided by the reviewer(s). From this user interface, a link is provided to direct the user to the Card Designer 340 to modify the design.

In some forms of the present application, the financial institution may request more than one layer of review. A multi-layer review scheme allows a lower level review to determine specific factors and may escalate the design to a higher level depending on the approval structure determined by the financial institution. If the order is "escalated", the system shall generate an alert to the second level reviewer(s) referenced in the Reviewer Approval interface, block 552 using the Reviewer Alert Mechanism, block 540. The e-mail shall contain a link to the Reviewer Approval interface, block 552.

The system may support transmission of a "design-ready message" to the institution/service provider, block 584. This message contains at least one of the following:
  identifier of the institution representing the user
  unique identifier for the user's card design session
  date and time of order
  order invoice number
  number of review cycles before approval The system transmits the message based on configuration information provided by the institution/service provider. The transmission methods which the system supports include at least one of HTTP and web service. The system requires that the destination host provide an acknowledgement in response to the message. In absence of a response, the system shall disconnect from the connected method, wait a specified period, then re-connect and attempt a retransmission of the same message. In one form of the present application, the system may provide a web service interface which allows an institution/service provider to query for design or order status based on the unique identifier for the user's card design session. This interface will return the above fields, at a minimum.

As shown in FIG. 4, after payment is processed, block 490, and the design review process is completed, block 340, the system supports transmission of the card design image, block 588 to the card producer. In one form, the card design image is adjusted to an uncompressed image at 300 dpi and to a size of 1050 by 672 pixels. When modifying size and resolution, the highest image quality should be maintained. The automated transmission of the image is based on configuration information provided by the institution/service provider. The transmission methods to be supported include at least one of HTTP, FTP and web service. In one form of the present application, the system requires that the destination host provide an acknowledgement in response to the message. In absence of a response, the system disconnects from the connected method, waits a specified period, then re-connects and attempts a retransmission of the same message. In one form of the present application, the system provides a web service interface which allows a card producer to retrieve the card design image based on the unique identifier for the user's card design session (session ID). In another form of the present application, the system provides an FTP interface which allows a card producer to retrieve the card design image based on a filename convention which uses the unique identifier for the user's card design session.

In at least one form of the present application, the system provides a management interface via Card Designer. Some forms contemplate the management interface may be restricted to administrative users of the system. The management interface supports at least one of the following features:
  Authorization of new institutions for use of the CCD system
  Modification of an institution's configuration parameters.
  Disablement of an institution's use of the CCD system.

It is envisioned that certain forms of the present application contemplate that the system may provide a configuration interface via Card Designer. The configuration interface is accessible by Global administrative users and administrative users for the associated Reseller and institution. At least one of the following configuration items is supported:
  Institution name and web site URL
  Branding graphical element
  Support contact information
  Payment configuration information
  Approval Review configuration information
  Design Ready Message interface configuration
  Image Data Transfer interface configuration FIG. 8 illustrates a flow chart illustrating administration of the consumer card designer by the financial institution/service provider. A representative of the financial institution logs into card designer at block 700 and has the option of selecting manage card templates block 710, manage orders block 720, or manage design catalog 730. The system supports creation of a new template block 740 or modification and/or deletion of one or more card design templates block 750. However, the system requires at least one card design template to be established. While either modifying or creating a template, the representative selects a card brand 760 (VISA®, MASTERCARD®, AMERICAN EXPRESS®, DISCOVER®) and then may add logo art work block 770, add textual elements 780, and/or specify tipping 790. In one form of the present application, the templates are identified by the card brand and the system prevents more than one card design template for a given brand to be active simultaneously.

The system provides the ability for the financial institutions/service providers to manage orders (block 720). This allows the representative to review the ordered designs block 800 and choose to approve the ordered design block 810. The representative may choose to reject or conditionally approve the card design block 820 after which the system sends a notification email to the user block 830. The representative may choose to accept the card design, block 840, and the system then sends a confirmation email to the user block 850. Further details regarding the approval process are described above with reference to FIG. 7.

The system may also provide the capability to modify the pre-designed background catalog for a given institution block 730. The modifying capability includes the ability to disable or add system-level backgrounds block 860 and/or disable or add categories block 870.

In some forms, the system may also provide a reporting capability which is restricted to appropriate users, which are determined by the financial institution. All reports support the download of tabular data corresponding to the report data using comma-separated value format. At least one of the following reports shall be supported:

Card Design History: filtered by date range, institution, reseller; displaying embossing line 3, card brand type, debit indicator, elapsed time from entry to order, elapsed time from order to approval, number of approval reviews; sortable. Rollup averages of elapsed times to be presented.

Order History: filtered by date range, institution, reseller; displaying embossing line 3, card brand type, debit indicator, order date and time, design-ready date and time, order price and payment source (institution vs. system). Rollup totals to be displayed for order price.

Excessive Rejects: filtered by date range, institution, reseller, minimum number of rejects; displaying embossing line 3, brand type, institution, number reseller, of rejects returned, number of orders placed.

Other forms of functionality may be supported by the system including: Archival; Diagnostics; and Logging. The system provides a mechanism by which a system administrator user can purge the system of unused design session information as well as outdated or obsolete card design and order information. The system provides at least one of the following diagnostic test capabilities:

Test connection to a selected institution's service provider for design-ready message Test design-ready message generation to a selected institution's service provider Test connection to a selected institution's card producer for image data Test image data generation to a selected institution's card producer The system also may provide a logging mechanism which can record activity within the system. The logging mechanism provides a reporting capability for review of log entries.

Figure 9:
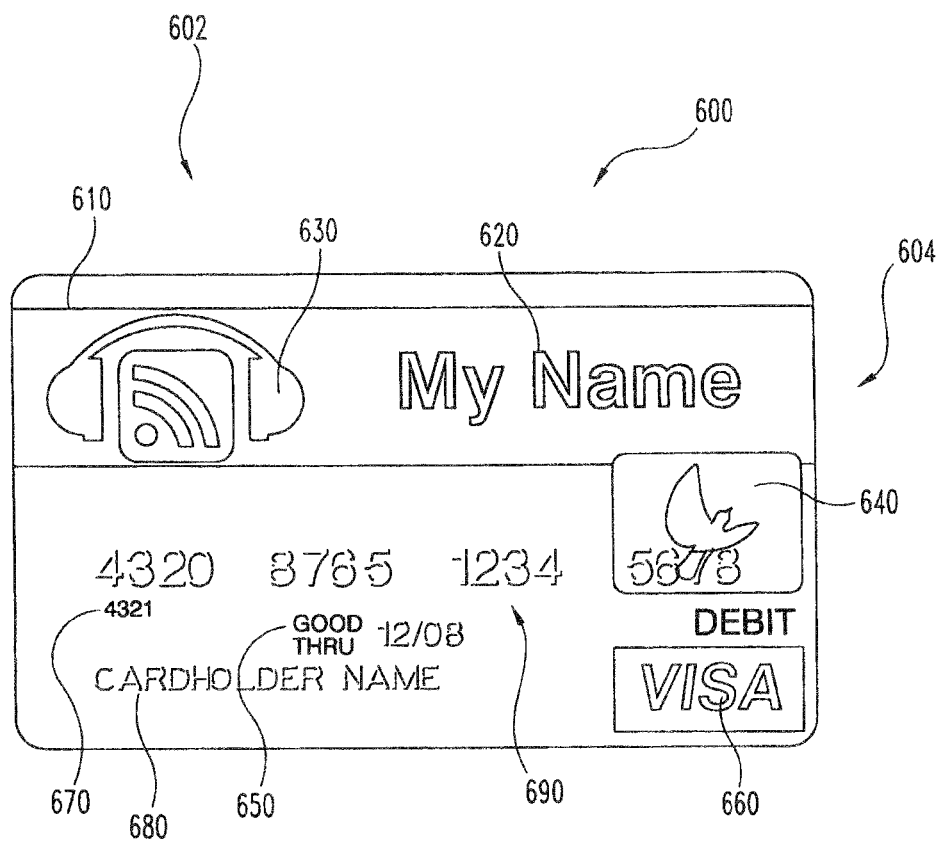
FIG. 9 is an illustrative view of a sample customized bank card.

The logging mechanism logs the following types of activity:
Security related events: login, logoff, incorrect login attempt, invalid page access
New User Registrations
Order Placement
Approval Responses
Application Start, Stop and Reset
Program Errors
Program Diagnostics and Performance Metrics As discussed above, the system is capable of supporting multiple, simultaneous users. The system maintains separate states, data and images for each simultaneous user. Simultaneous users shall be prevented from accessing the state, data or image of another user. In one exemplary embodiment, the system supports 100 simultaneous users per server and any number of servers may be present to handle the load providing acceptable responsiveness within the load capacity requirements set forth. Other embodiments contemplate larger numbers of users per server. On a high speed connection, acceptable responsiveness may be defined using the following guidelines:

Access to the main display within 1 second
Complete display of data-driven screens within 4 seconds
Complete display of image lists within 10 seconds With reference to FIG. 9, there is illustrated a customized bank card 600 created by the consumer card designer application. Customized bank card 600 includes user provided data 602 and payload provided data 604. In one form of the present application, user provided data 602 includes a card background image 610 and a user textual element 620 both selected and/or provided by the user. Payload provided data 604 includes a graphical logo 630, a brand hologram 640, good thru text 650, and a brand log 660 which are preferably provided from the financial institution's template. Payload provided data 604 further includes a BIN number 670, embossing lines 3 and 4 (cardholder name) 680, and a card number and expiration date 690 which are all preferably provided by the record. Customized bank card 600 is an illustrative embodiment and other forms of the present application recognize the customized bank card could include additional data, less customization, and/or the data could come from other locations then those illustrated above with reference to FIG. 9.

Figure 10:
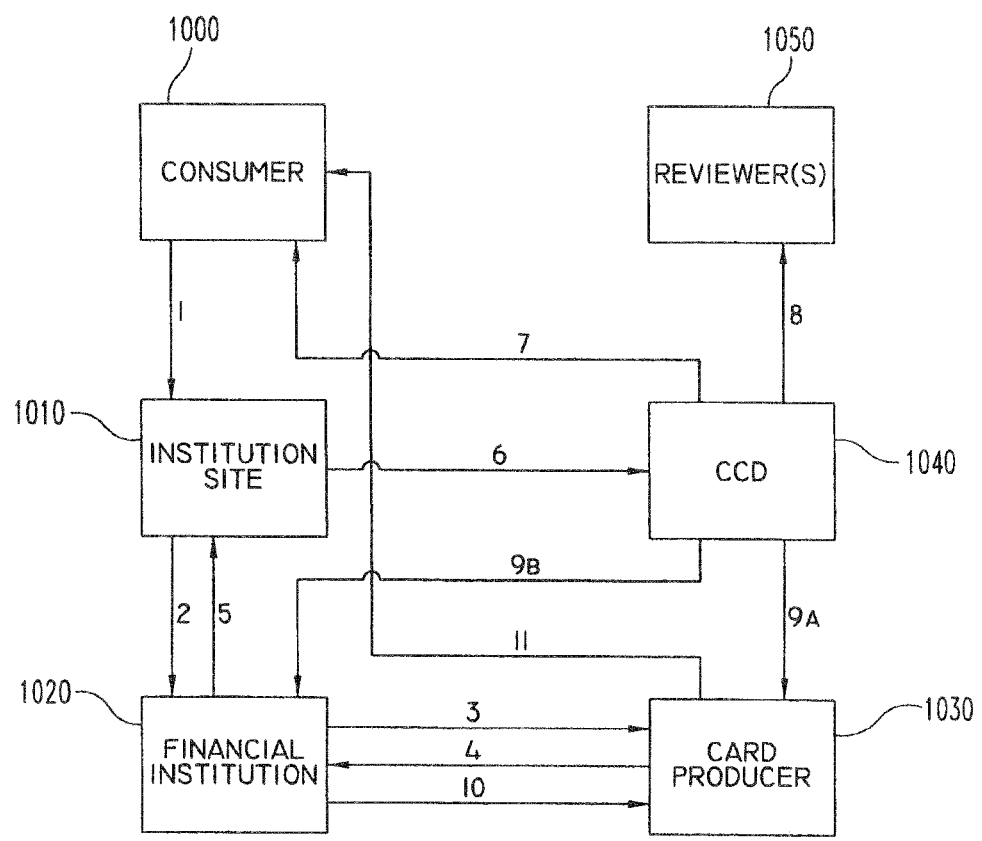
FIG. 10 is an illustrative process flow.

Referring now to FIG. 10, there is illustrated a process flow chart showing an implementation of the system utilizing a group of financial institutions or service providers collectively referred to as "Financial Institution". These groups or service providers typically provide the home banking solution to respective institutions and may also be a payment system aggregator; examples of these groups/providers include a Credit Union Service Organization and the Independent Community Bank Association. As shown in FIG. 10, the following events and data flows take place. This sequence shows only a complete success path and does not describe an aborted session or any failure paths.

1 Consumer/User (1000) visits the Institution's web site (home banking solution) (1010) and elects to begin a card design session associated with a specific card account.

2 Institution web site (1010) connects securely to Financial Institution (1020) and requests a URL or payload information relative to the card account identifier and primary or secondary cardholder.

3 Financial Institution (1020) connects securely to Card Producer (1030) and requests a fulfillment record including the account card brand type (VISA, MASTERCARD, AMERICAN EXPRESS, DISCOVER), Debit indicator, embossing lines 3 and 4 and the BIN number.

4 Card Producer (1030) returns the requested data to Financial Institution (1020).

5 Financial Institution (1020) constructs the URL/payload and returns it to the Institution web site (1010).

6 The user (1000) is redirected to Consumer Card Designer Application (1040) using the constructed URL/payload. The user (1000) interacts with Consumer Card Designer Application (1040) and produces a complete card design.

7 The user (1000) orders the card design and a confirmation e-mail is generated to the user (1000).

8 An alert e-mail is transmitted to the reviewer(s) (1050). The order is reviewed and approved.

9 a. The card design image is transmitted to the Card Producer (1030).
b. A Design Ready Message is sent to the Financial Institution (1020).

10 Financial Institution (1020) sends the embossing request to the Card Producer (1030) who then produces the card.

11 Card Producer (1030) delivers the physical printed card to the consumer.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method comprising:

receiving, at a secure card design server, an initiation request of a user of a user computer terminal to create a customized transaction card from an institution web page hosted on an institution server separate from the secure card design server, wherein the request comprises the user selecting a specific link provided from the institution server;

creating a secure connection between the secure card design server and the user computer terminal, wherein the secure card design server includes data corresponding to a consumer card designer application;

receiving a payload at the secure card design server in response to the initiation request, wherein the payload includes an institution key identifying an institution associated with the institution server and a specification comprising configuration information for the configuration of the consumer card designer application based at least in part on the institution key;

transmitting the data corresponding to consumer card designer application stored on the secure card design server to the user computer terminal;

configuring the consumer card designer application to be operable based on the configuration information identified by the institution key of the payload, to allow the user of the user computer terminal to create the customized transaction card, wherein the consumer card designer application includes at least one card design template that is presented by the user computer terminal to the user of the consumer card designer application and the at least one card design template is generated based on the specification comprising the configuration information that is based on the institution key of the payload, and wherein the consumer card designer application is configured for presentation of the at least one card design template based on the institution key prior to initiating a design session at the user computer; and receiving, at the secure card design server, a card design image from the user computer terminal based on at least one user input to the configured consumer card designer application presented at the user computer terminal for customization of the customized transaction card in relation to the at least one card design template presented by the user computer terminal to the user of the consumer card designer application subsequent to the initiating.

2. The method of claim 1, wherein the payload further includes at least one of a user key identifying the user; a session identifier; or initiation data.

3. The method of claim 1, wherein the user generates the card design image from an image.

4. The method of claim 3, wherein the consumer card designer application is configured and operable to allow the user to rotate the card design image flip the card design image; crop the card design image; alter the color of the card design image; and overlay an additional image over the image.

5. The method of claim 1, further comprising the step of storing the card design image to the secure card design server.

6. The method of claim 1, further comprising the step of receiving payment for the customized transaction card.

7. The method of claim 6, further comprising the step of confirming payment for the customized transaction card.

8. The method of claim 1, further comprising the steps of:

generating a session ID that is associated with the user for later identification of the user; and corresponding the session ID to at least one of user defined user information and institution defined user information.

9. A system, comprising:

a user terminal communication port operable to communicate with a user computer terminal to receive a request to initiate a design session of a user of the user computer terminal by way of an institution website and receive a payload in response to the request to initiate a design session, wherein the payload includes an institution key identifying an institution associated with the institution server from which the request is received and associated with a specification comprising configuration information based at least in part on the institution key for a consumer card designer application;

a communication link;

a secure card producer server operable to connect using the user terminal communication port over the communication link with the user computer terminal based on the user request to initiate the design session and to generate a session ID based on the received payload corresponding to the design session, the secure card producer server including the consumer card designer application on a memory device, wherein the consumer card designer application is configured and operable at least partially based on the configuration information that is based at least in part on the institution key of the payload and is operable to be communicated to the user computer terminal and operated locally on the user computer terminal to present to a user of the user computer terminal at least one card design template that is generated based on the specification comprising the configuration information, the consumer card designer application further being operable to, subsequent to the configuration of the consumer card designer application, receive user instructions and create a customized card image based on one or more of the user instructions received after configuration of the consumer card designer application; and an approver module operable to review the customized card image for appropriateness; and wherein the user terminal communication port is operable to receive the customized card image from the secure card producer server and the customized card image is reviewed by the approver module.

10. The system of claim 9, wherein the user inputs include at least one of cropping the image; resizing the image; changing the color of the image; and overlaying an additional image over the image.

11. A method comprising:

initiating a session to create a customized transaction card based on a request by a user at a remote terminal to create the customized transaction card from an institution web page hosted on an institution server, wherein the request comprises the user selecting a specific link provided from the institution server;

transmitting a consumer card designer application to the remote terminal in response to the request by the user, the consumer card designer application being stored on a secure card producer server and operable locally on the remote terminal to execute the session of the customer card designer application;

receiving a payload at the secure card producer server associated with the request and prior to the initiating, wherein the payload includes a specification corresponding to the institution web page from which the request is received and comprising configuration information for configuration of a card design template of the consumer card designer application based at least in part on the institution web page of the request that corresponds to contextual information corresponding to the session;

generating a session ID based on the payload; and receiving a card design image from the remote terminal created utilizing the session of the consumer card designer application on the remote terminal subsequent to the initiating, wherein at least one of a customized appearance or a function of the session is at least partially based on the contextual information received in the payload and is configured prior to the receiving;

wherein at least one of the customized appearance or the function that is based on the specification corresponding to the institution web page includes a predetermined card template, an initial card specification, terms and conditions text, privileges text, a branding graphical element, support contact information, and payment configuration information used to configure the consumer card designer application.

12. The method of claim 11, wherein the contextual information included in the payload includes at least one of an institution key identifying an institution; a user key identifying the user; initiation data regarding the session; and data regarding the transaction card to be designed.

13. The method of claim 11, wherein the card designer application transmits data corresponding to at least one card design template based on the contextual information to the remote terminal for use in the session at the remote terminal.

14. The method of claim 11, wherein the user manipulates an image with at least one user input to the consumer card designer application to create the card design application.

15. The method of claim 14, wherein said at least one user input includes rotating the image, flipping the image; cropping the image; altering the color of the image; and overlaying an additional image over the image.

16. The method of claim 11, transmitting a database of selectable images to the remote terminal.

17. The method of claim 16, wherein the database of selectable images is at least partially based on the contextual information.

18. The method of claim 12, wherein the transaction card is one of a credit card, prepaid card, debit card, or gift card.

19. The method of claim 9, wherein a fully automated approver module is operable to review the customized card image for appropriateness; and wherein the user terminal communication port is operable to receive the customized card image from the secure card producer server, the customized card image is reviewed by the fully automated approver module.

* * * * *